Patented Dec. 11, 1951 2,577,743

UNITED STATES PATENT OFFICE 2,577,743

METHOD AND COMPOSITION FOR PRODUCTION OF CELLULAR THERMOPLASTIC PRODUCTS

Chancey E. De Long, Freeland, Mich., assignor to The Dow Chemical Company, Midland, Mich., a corporation of Delaware No Drawing. Application October 22, 1948, Serial No. 56,063

15 Claims. (Cl. 18—55)

This invention concerns an improved method and certain compositions for the production of cellular organic thermoplastic resins in the form of elongated bodies of desired cross sectional shapes and dimensions, e. g. in the form of panels, planks, or beams of predetermined sizes and substantially free of warp or twist throughout their length. The products consist essentially of solid masses of individually closed cells having thin walls of the thermoplastic resin. The invention is applicable in making such shaped cellular bodies from solid thermoplastic resins in general, but pertains especially to production of the bodies from resinous benzene-soluble polymers and copolymers of monoalkenyl aromatic compounds having, as the alkenyl radical, a vinyl or an isopropenyl group attached directly to a carbon atom of the aromatic nucleus. It pertains more particularly to the production of such shaped, cellular, elongated bodies of polystyrene.

Munters et al., in U. S. Patent No. 2,023,204, disclose a method that is effective in making small cellular bodies of thermoplastic resins. The method involves heating under pressure in a closed vessel, granules of the non-cellular resin together with a normally gaseous agent, e. g. methyl chloride, capable of being dissolved under pressure by the resin, and extruding the resultant solution from the vessel, whereupon it expands upon release of the pressure to form a cellular body due to vaporization of the dissolved normally gaseous agent. The patent further discloses that the cellular resin product, which is a mass of individually closed, thin-walled cells, is useful as a heat insulating material and that its insulating property may be improved by incorporating certain finely divided solids, such as powders of aluminum or other metals, in the composition which is expanded to form the cellular product.

McIntire, in U. S. Patent 2,450,436, shows that certain precautions and operating conditions are required in order to make large-sized cellular bodies of thermoplastic resins, e. g. having a minimum dimension of at least two inches, in a form which remains stable on standing and is of good quality. In brief, McIntire discloses that the normally gaseous agent should be dissolved under pressure in the resin at a temperature which, just prior to extrusion of the resin, is below the critical temperature of the normally gaseous agent, and that said agent should thus be dissolved to form a mobile gel containing the agent in amount such as to be vaporized substantially completely upon release of the pressure with resultant swelling and cooling of the resin to a temperature within a range of between −30° C. and ten degrees above the heat distortion temperature of the resin, as determined in accordance with A. S. T. M. D648–41T. Cellular bodies of substantially uniform cell size and which remain stable, i. e. do not collapse on standing, may thus be produced in the form of logs having diameters as great as 3 feet, or more, and lengths as great as 60 feet. The logs may be cut into insulating panels or other forms desired for industrial purposes.

In the production of elongated cellular bodies of thermoplastic resins by the methods of the above-discussed Munters et al. and McIntire patents, the resin gel formed by dissolving the normally gaseous agent in the resin at superatmospheric pressure, expands immediately and very rapidly upon flowing from the pressurizing vessel containing the same with a result that the cellular body is quickly formed and cooled to a temperature at which it is substantially rigid. However, it frequently happens that the rapid expansion with cooling to form the cellular body is followed by a slower twisting of the product, due presumably to a continuance of the cell-forming action within the exteriorly cooled and hardened body. As a result, logs, planks, etc., of the product are sometimes distorted so that considerable trimming is necessary to obtain uniformly shaped panels, or slabs, etc., suitable for marketing.

In order to reduce the amount of trimming necessary, and the resultant loss of a considerable portion of the cellular product as scrap material, it is desirable that the material be pressed, during expansion and formation of the cellular product, into the shape of beams or slabs, e. g. of as nearly square or rectangular cross section as possible. Such pressing may be accomplished by causing the resin gel to flow from the pressurizing vessel through an orifice and thence, during expansion, through a flared rectangular tube of an internal cross sectional area greater than that of the orifice from the vessel but less than that of the cellular body that is formed upon permitting unrestricted expansion of the gel flowing from said orifice.

Although such pressing of the expanding gel aids greatly in causing formation of cellular slabs or beams of a desired shape and size, a large proportion of the shaped products are far from perfect so that considerable trimming is necessary. For instance, beams formed by expansion of the gel during passage through a rectangular tube frequently have rounded corners, and many of the slabs formed by rolling of the expanding gel are of non-uniform thickness. The large proportion of imperfect beams and slabs is apparently due to excessively rapid and non-uniform expansion and cooling of the resin gel during formation of the cellular product. The incorporation of insoluble finely divided materials, e. g. aluminum powder, pigments, or carbon black, etc., in the resin gel usually causes an increase in the rate of expansion and cooling of the gel on release of the pressure thereon and renders it even more difficult to shape the gel during expansion to form the cellular product. Such fillers, when used, are usually employed in amount corresponding to from 0.5 to 10 per cent of the weight of the resin component of the gel, the preferred proportion being dependent on the kind of filler used.

I have found that certain metal stearates, when incorporated in minor amount in the resin gel within a pressurizing vessel, have an effect of retarding greatly the rate of expansion of the gel upon release of the pressure and that such stearates apparently also improve the uniformity of expansion and cooling of the resin during extrusion of the gel from the pressurizing vessel containing the same. Accordingly, the stearates facilitate the operations of shaping the material undergoing expansion to form elongated cellular bodies of desired cross sectional sizes and shapes.

The stearates which I have found to be effective are barium stearate, calcium stearate, lead stearate and zinc stearate. Of these, barium stearate appears to be most effective and zinc stearate least effective when both are employed in the same proportion on a weight basis. Other metal stearates which have been tested, e. g. sodium stearate, magnesium stearate, and aluminum stearate, have had relatively little if any effect in retarding the rate of expansion of such gel and have impaired the quality of the product. The stearates of barium, calcium and lead are all considerably more effective than zinc stearate in retarding the rate of expansion, but any of these stearates, individually or in admixture with one another, can be used to produce shaped cellular resinous bodies of good quality.

Accordingly, the invention provides an improved method for the production of cellular thermoplastic resins directly in the form of elongated bodies of desired cross sectional sizes and shapes. It also provides a mobile gel comprising a thermoplastic resin, a dissolved normally gaseous agent and one or more of the compounds barium stearate, calcium stearate, lead stearate, and zinc stearate, which gel may advantageously be employed for the production of such shaped cellular resin bodies.

The resin gel compositions provided by the invention comprise a thermoplastic resin having a normally gaseous agent dissolved therein and having, incorporated therewith, one or more of the stearates of barium, calcium, lead and zinc in amount corresponding to from 0.04 to 1 per cent of the weight of the resin. The proportions of stearate just given are sufficient to retard markedly the rate of expansion of the gel and to permit shaping of the expanding gel, but are not sufficient to interfere with any of the operations of the process or to impair appreciably the quality of the cellular product. In practice, a stearate of barium, calcium, or lead, or a mixture of two or more such stearates, is preferably used in amount corresponding to from 0.06 to 0.1 per cent of the weight of thermoplastic resin in the gel.

The stearate may be incorporated in the resin prior to, or during, formation of the resin gel. For instance, the stearate may be milled together with the non-cellular resin to form a substantially uniform body which may be cut, or ground, to granules or small particles suitable for use in forming the gel. Alternatively, an intimate mechanical mixture of the powdered stearate and finely divided thermoplastic resin may be used directly in forming the gel. In either such instance, the mixture of stearate and resin is treated with a normally gaseous agent, e. g. methyl chloride, methyl ether, ethyl ether, methyl ethyl ether, or a cracked-oil gas fraction rich in ethylene, propylene, or butylene, etc., under a pressure sufficient to cause dissolving of a considerable proportion of said agent in the resin. A suitable procedure for forming a resin gel under pressure in a closed vessel is described in detail in the McIntire U. S. Patent No. 2,450,436. The normally gaseous agent is dissolved, in the resin, in amount sufficient to form a gel capable of flowing from the vessel, said amount being such that the dissolved agent undergoes substantially complete vaporization upon release of the pressure with resultant expansion and cooling of the resin to a temperature between −30° C. and ten degrees above the heat distortion temperature of the resin, due to the heat of vaporization of said agent.

Other ingredients such as finely divided metals, carbon black, or powdered calcium silicate, etc., may, if desired, be incorporated in the gel together with the stearate.

The gel thus formed under pressure in a closed vessel is, if necessary, brought to a temperature between room temperature and the critical temperature of the normally gaseous agent and a valve, below the level of the gel in the vessel, is opened to permit extrusion of the gel. The stearate-containing gel expands quite uniformly during flow from the vessel, the rate of expansion being far less than that of a gel containing no stearate, but of otherwise similar composition. During flow from the vessel, the expanding gel is shaped under externally applied pressure into a slab, a rectangular beam, or into an elongated cellular article of other desired cross section, as hereinbefore described.

The following examples describe certain ways in which the invention has been practiced, but are not to be construed as limiting its scope.

*Example 1*

A mixture of solid granular polystyrene, powdered barium stearate in amount corresponding to 0.06 per cent of the weight of the polystyrene, and powdered calcium silicate in amount corresponding to 0.6 per cent of the weight of the polystyrene was passed under a mechanically applied pressure, i. e. by means of an extruder, to a zone where the mixture was heated to about 180° C. to melt the polystyrene and methyl chloride, in amount corresponding to from 13 to 14 per cent of the weight of the polystyrene, was injected under pressure into the mixture. The resultant mixture was caused to flow from said zone to another zone where it was cooled to approximately 100° C. and thence into a closed storage vessel where it was stored at about said temperature and at an applied pressure of about 400 pounds per square inch for several, e. g. 3 to 8, hours. A flowable gel of polystyrene containing dissolved methyl chloride and having the barium stearate and calcium silicate dispersed therein was thus formed. An outlet valve, below the level of the gel in the vessel was opened to permit extrusion of gel from the vessel. The material extruded, at a rate of about 2500 pounds of its polystyrene component per hour, as a clear gel for a distance of about 6 inches from the orifice. Expansion of the gel then became apparent. The gel was expanded into a solid cellular polystyrene body of approximately 5 inches thickness and 12 inches wide by the time the material had traveled a distance of one foot from the extrusion orifice.

Another experiment was carried out as just stated, except that the stearate was omitted from the gel composition. In this instance, the gel also extruded at a rate of about 2500 pounds of its polystyrene component per hour, but expansion was apparent immediately as the material flowed from the pressurizing vessel outlet and expansion to a solid cellular body of approximately the above dimensions was complete when the material being extruded had traveled about 6 inches from the orifice.

*Example 2*

Other experiments were carried out in a manner similar to those described in Example 1, except that in these respective experiments stearates of calcium, lead, zinc, magnesium, aluminum and sodium were individually employed, instead of the barium stearate of Example 1, as the stearate component of the mobile polystyrene gel. It was found that the stearates of calcium and lead are highly effective, although not quite as effective as barium stearate in retarding the rate at which such gel expands upon release of the pressure thereon; that zinc stearate is also effective for such purpose, but not as effective as the other stearates just mentioned; and that the stearates of magnesium, aluminum and sodium each exhibited little retarding action on the rate of swelling, but each caused degradation (apparently partial depolymerization) of the polystyrene and thereby impaired the quality of the product. The stearates of barium, calcium, lead and zinc apparently had no chemical action on the polymer and did not impair the quality of the cellular material being formed.

*Example 3*

The two procedures described in Example 1 were carried out on a large scale, except that in each instance the polystyrene gel being extruded from the pressurizing vessel was shaped by external pressing, during expansion of the same, to produce cellular polystrene planks of approximately 5 inches thickness and of from 12 to 14 inches width. The orifice used as an outlet for extrusion of the gel from the vessel had a horizontal length of 3¼ inches and a minimum width of ⅛ inch and had rounded corners with each side bowed inward at the center thereof. Mounted over the orifice was a flared tubular shaping member. The tube channel had a cross section, bounded by inner walls of the tube, similar in shape to that of the orifice. Adjacent to the orifice, the horizontal length of said tube cross section was 4⅜ inches and its minimum width was 1½ inches. The tubular shaping member was 8 inches long with its principal axis in horizontal alignment with the orifice. The horizontal length of a cross section of the tube channel was 11 inches and its minimum width was 3¾ inches at the outlet end of the tube. Except for the inward bowing of its sides, the flared tube had the general shape of a truncated rectangular pyramid. At a distance of approximately 4 inches beyond the outlet end of the shaping tube, and aligned to receive material from the tube, were a pair of endless belts, one above another and each of approximately 100 foot length. The belts were positioned and operated to carry the cellular polystyrene product between the mating belts a distance of about 50 feet from the tubular shaping member. Parallel surfaces of the mating belts were spaced apart 5 inches at the receiving end of the belt travel and 6 inches at the delivery end of said travel. The belts carried the cellular product therebetween in a linear direction for a distance of about 50 feet. They aided somewhat in shaping and dimensioning the thickness of the planks of cellular polystyrene, but served principally to prevent warpage of the planks during the time required for them to attain a final set. The planks thus produced were trimmed at the sides to a thickness of 4 inches and to widths of 10 or 12 inches. The trimmed planks were examined for blow holes and other surface irregularities and also for warpage. Planks free from such flaws were graded as of No. 1 quality and planks having any such flaw were of No. 2 quality. In one month of operation using the polystyrene gel containing no stearate, there were produced 168,376 board feet of No. 1 cellular polystyrene planks and 113,620 board feet of No. 2 planks. In another month of operation using the polystyrene gel containing barium stearate in amount corresponding to 0.06 per cent of the weight of the polystyrene, there were produced 316,405 board feet of No. 1 cellular polystyrene planks and only 22,245 board feet of No. 2 planks. The barium stearate employed in the gel facilitated shaping of the planks during formation and improved the uniformity of the planks obtained.

Other modes of applying the principle of the invention may be employed instead of those explained, change being made as regards the method or compositions herein disclosed, provided the steps or ingredients stated by any of the following claims or the equivalent of such stated steps or ingredients be employed.

I therefore particularly point out and distinctly claim as my invention:

1. A gel-like composition, comprising an intimate mixture of a thermoplastic resin, at least one stearate, of the group consisting of barium stearate, calcium stearate, lead stearate and zinc stearate, in amount corresponding to from 0.04 to 1 per cent of the weight of the resin component, and a normally gaseous agent dissolved in the resin in amount sufficient to form therewith a flowable gel.

2. A gel-like composition comprising an intimate mixture of a benzene-soluble thermoplastic resin, a filler, at least one stearate, of the group consisting of barium stearate, calcium stearate, lead stearate and zinc stearate in amount corresponding to from 0.04 to 1 per cent of the weight of the resin component, and a normally gaseous agent, dissolved in the resin, in amount sufficient to form a flowable gel.

3. A gel-like composition, as described in claim 2, wherein the stearate component is barium stearate.

4. A gel-like composition, as described in claim 2, wherein the stearate component is calcium stearate.

5. A gel-like composition, as described in claim 2, wherein the stearate component is lead stearate.

6. A gel-like composition, as described in claim 2, wherein the thermoplastic resin component is polystyrene, and the stearate component is barium stearate, the latter being present in amount corresponding to from 0.06 to 0.1 per cent of the weight of the polystyrene.

7. A gel-like composition, as described in claim 2, wherein the resin component is polystyrene, and the stearate component is calcium stearate, the latter being present in amount corresponding to from 0.06 to 0.1 per cent of the weight of the polystyrene.

8. A gel-like composition, as described in claim 2, wherein the resin component is polystyrene and the stearate component is lead stearate, the latter being present in amount corresponding to from 0.06 to 0.1 per cent of the weight of the polystyrene.

9. In a method wherein an elongated cellular body of predetermined cross-sectional size and shape is made by forming, at superatmospheric pressure, a flowable gel comprising a thermoplastic resin having a normally gaseous agent dissolved therein, extruding said gel through an orifice to a zone of lower pressure within a confined space between the walls of a shaping member, whereupon the extruded material expands against said walls during travel between the same, so that the cellular body being formed is shaped by the walls, the step of incorporating in the gel, prior to its extrusion, at least one stearate of the group consisting of barium stearate, calcium stearate, lead stearate and zinc stearate, said stearate being added in amount corresponding to 0.04 to 1 per cent of the weight of the resin component of the gel.

10. A method, as described in claim 9, wherein the stearate is barium stearate.

11. A method, as described in claim 9, wherein the stearate component is calcium stearate.

12. A method, as described in claim 9, wherein the stearate component is lead stearate.

13. A method, as described in claim 9, wherein the thermoplastic resin component is polystyrene, and the stearate component is barium stearate, the barium stearate being preesnt in amount corresponding to from 0.06 to 0.1 per cent of the weight of the polystyrene.

14. A method, as described in claim 9, wherein the resin component is polystyrene, and the stearate component is calcium stearate, the latter being present in amount corresponding to from 0.06 to 0.1 per cent of the weight of the polystyrene.

15. A method, as described in claim 9, wherein the resin component is polystyrene and the stearate component is lead stearate, the latter being present in amount corresponding to from 0.06 to 0.1 per cent of the weight of the polystyrene.

CHANCEY E. DE LONG.

REFERENCES CITED

The following references are of record in the file of this patent:

UNITED STATES PATENTS

| Number | Name | Date |
|---|---|---|
| 2,023,204 | Munters et al. | Dec. 3, 1935 |
| 2,242,372 | Schneider | May 20, 1941 |
| 2,317,137 | Fletcher | Apr. 20, 1943 |
| 2,365,375 | Bailey et al. | Dec. 19, 1944 |
| 2,450,436 | McIntire | Oct. 5, 1948 |
| 2 461 761 | Nye | Feb. 15, 1949 |